March 2, 1965  M. G. H. GIRODIN  3,171,509
LUBRICATING ARRANGEMENT FOR MOTION CONVERTING DEVICES
Filed April 20, 1962
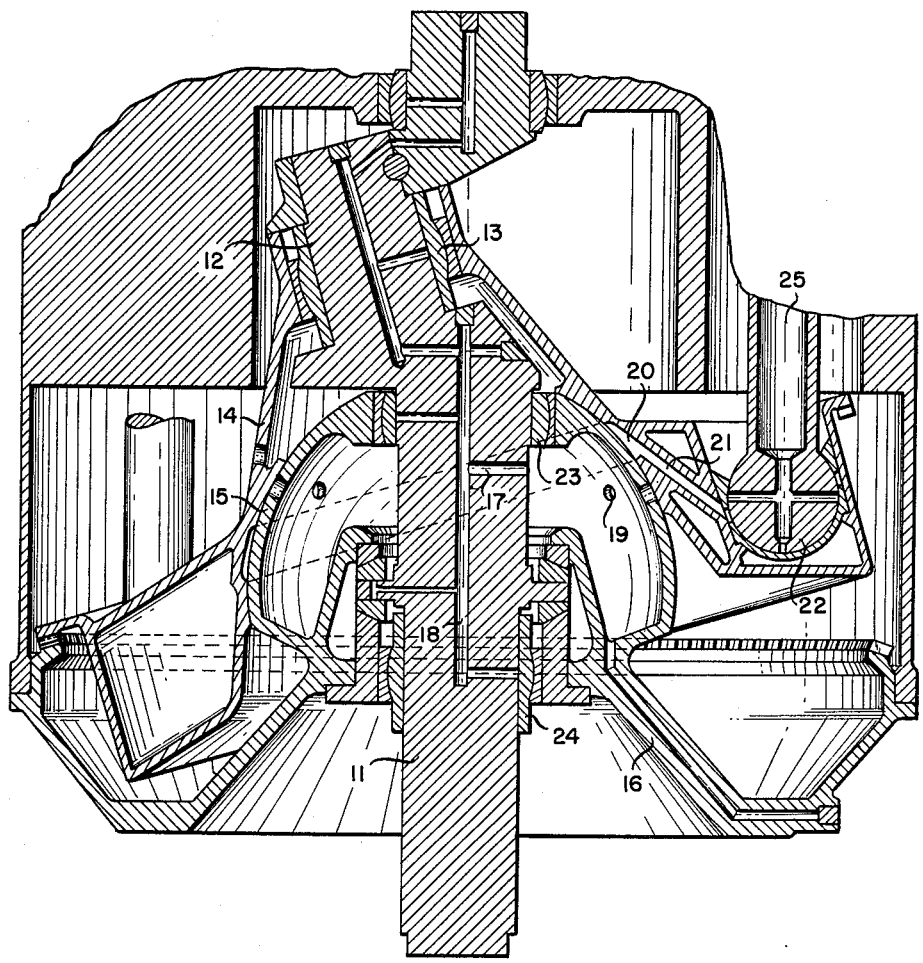
INVENTOR
*Marius Georges Henri Girodin*
BY *John J. Dennemeyer*
ATTORNEY

United States Patent Office

3,171,509
Patented Mar. 2, 1965

3,171,509
LUBRICATING ARRANGEMENT FOR MOTION
CONVERTING DEVICES
Marius Georges Henri Girodin, 20 Place de la Madeleine,
Paris, France
Filed Apr. 20, 1962, Ser. No. 189,100
Claims priority, application France, Apr. 25, 1961,
859,734
7 Claims. (Cl. 184—6)

The present invention relates to the lubrication of mechanisms for the conversion of longitudinal movement of pistons into a rotating movement and vice versa, in which the transformation takes place by means of a swivel member, having a wobbling movement, on which bear the ends of the piston rods.

The present invention has for its object the lubrication of such mechanisms.

According to the invention, the oil is supplied by any suitable means to the interior of the swivel member, one or more passages being provided within said member, whereby the oil is led from interior to each enlarged end of the piston rods.

According to one embodiment of the invention, the oil is led to the interior of the swivel member by means of passages disposed in the shaft supporting said swivel member.

According to an embodiment of the invention which is applicable with the mechanisms of the type described in which the swivel member is supported by a fixed spherical bearing, the oil is led to the interior of said bearing and passes from the interior of said bearing to the interior of said swivel member and into the shaft.

A first advantage of this arrangement is to have a large reservoir of oil at the center of the device, thus reducing the length of the ducts through which the oil is forced under pressure.

Another advantage is to avoid the considerable difficulty experienced in lubricating mechanism of the above stated type due to centrifugal forces, either throwing the lubricant towards the periphery of the device, or preventing the movement of the lubricant in the oil ducts.

With the arrangement according to the invention the lubricant is fed to and distributed in the swivel member in the absence of any centrifugal force, and is fed into the rotary shaft and into the oblique crankpin under a minimum of action of the centrifugal forces, and in a direction in which the movement of the lubricant in the ducts is facilitated by these forces.

Other characteristics of the invention will be apparent from the following description, which is given solely by way of example and with reference to the accompanying drawings in which the single figure is an axial section of a mechanism lubricated in accordance with one embodiment of the invention.

In the figure, the crankshaft 11 carries the oblique crank pin 12 which turns in the bearing 13 integral with the head of the swivel member 14, which is supported on the fixed hollow bearing member 15. The oil is delivered by a pump (not shown) into the passage 16 of the casing which leads into the interior of the hollow spherical bearing 15. Passages 17 disposed in the crankshaft 11 gives access to the axial passage 18 when the oil is distributed to lubricate the crankshaft bearings 23 and 24 and crankpin bearing 13. One or more apertures such as 19 are provided in the spherical bearing 15 and disposed to be normally closed by the internal bearing surface of the swivel member, and during operation are momentarily put in direct communication with cavities, such as 20, disposed in the interior of the swivel member 14, whence it is distributed through one or more passages disposed in said swivel member, such as 21, to the enlarged ends 22 of the piston rods 25.

The details of the mechanism and of its operation are well known to persons skilled in the art and have been described for example in my U.S. Patent 2,702,483 or in my British Patent 821,751.

What I claim is:

1. A lubrication arrangement for movement converting devices of the barrel type comprising a plurality of stationary cylinders arranged about a rotary shaft, piston members in said cylinders, a swivel member operatively connected to said piston members and said rotary shaft for converting the linear movement of said piston members into a rotary movement of said shaft, a stationary hollow support bearing for said swivel member and receiving lubricant under pressure, said hollow support bearing having a spherical top portion, an inner bearing surface on said swivel member and engaging said spherical top portion for sliding movement thereon, peripheral bearings in said swivel member receiving the ends of said piston members, duct means in said inner bearing surface of said swivel member and leading to said peripheral bearings, and apertures in said spherical top portion of said hollow bearing and cooperating with said duct means during operation to pass lubricant from said hollow support bearing to said inner bearing surface and said peripheral bearings.

2. The arrangement according to claim 1 wherein said rotary shaft is mounted in line bearings fixed to said hollow support bearing and that passageways in said rotary shaft communicate with the interior of said hollow bearing to pass lubricating oil to said line bearings.

3. The arrangement according to claim 1 wherein said shaft has an obliquely disposed crankpin extending upwardly of said hollow support bearing, a crankpin bearing fixed to said swivel member and encircling said crankpin, and passageways in said rotary shaft and in said crankpin communicating with said hollow support bearing to pass lubricating oil to said crankpin bearing.

4. The arrangement according to claim 1 wherein the ends of said piston rods have diametrically extending passageways communicating with said duct means to pass lubricant to the side of said peripheral bearing remote from said duct means.

5. The arrangement according to claim 1, wherein said apertures in said spherical top portion are normally closed by the internal bearing surface of said swivel member and communicate momentarily with said duct means during operation of said swivel members.

6. A lubricating arrangement for movement converting devices of the barrel type comprising a plurality of stationary cylinders arranged about a rotary shaft, a swivel member supported on said rotary shaft and having a plurality of peripheral bearings, piston members mounted in said cylinders, said piston members having piston rods received in said peripheral bearings, a stationary hollow support bearing disposed around said shaft and defining a chamber for receiving lubricant under pressure, said hollow support bearing having a spherical top portion, an inner bearing surface on said swivel member and engaging said spherical top portion of said hollow support bearing for sliding movement thereon, duct means in said inner bearing surface of said swivel member and leading to said peripheral bearings, apertures in said spherical top portion of said swivel support bearing and cooperating with said duct means, line bearings secured to said stationary support bearing and engaging said rotary shaft, and passageways in said rotary shaft communicating with said hollow support bearing to pass lubricating oil to said line bearings.

7. The arrangement according to claim 6 wherein said shaft has an obliquely disposed crankpin extending upwardly of said hollow support bearing, a crankpin bearing fixed to said swivel member and encircling said crankpin, and passageways in said rotary shaft and in said crankpin communicating with said hollow support bearing to pass lubricating oil to said crankpin bearing.

References Cited in the file of this patent

UNITED STATES PATENTS

| | | |
|---|---|---|
| 1,315,538 | Burtnett | Sept. 9, 1919 |
| 1,555,165 | Sherman | Sept. 29, 1925 |
| 1,839,592 | Reynolds | Jan. 5, 1932 |
| 2,332,105 | Neuland | Oct. 19, 1943 |
| 2,737,055 | Dauben | Mar. 6, 1956 |

FOREIGN PATENTS

| | | |
|---|---|---|
| 823,934 | France | Oct. 25, 1937 |
| 432,019 | Italy | Mar. 10, 1948 |
| 821,751 | Great Britain | Oct. 14, 1959 |